United States Patent
Li et al.

(10) Patent No.: US 11,244,392 B2
(45) Date of Patent: Feb. 8, 2022

(54) VIRTUAL RESOURCE ALLOCATION METHOD AND DEVICE BASED ON BLOCKCHAIN

(71) Applicant: Advanced New Technologies Co., Ltd., Grand Cayman (KY)

(72) Inventors: Min Li, Hangzhou (CN); Hui Xu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 4 days.

(21) Appl. No.: 16/815,917

(22) Filed: Mar. 11, 2020

(65) Prior Publication Data
US 2020/0226679 A1 Jul. 16, 2020

Related U.S. Application Data

(63) Continuation of application No. PCT/CN2020/071600, filed on Jan. 11, 2020.

(30) Foreign Application Priority Data

Jun. 11, 2019 (CN) .......................... 201910502645.8

(51) Int. Cl.
*G06Q 40/02* (2012.01)
*G06Q 10/10* (2012.01)
(Continued)

(52) U.S. Cl.
CPC ......... *G06Q 40/025* (2013.01); *G06F 9/5027* (2013.01); *G06F 16/2379* (2019.01); *G06Q 10/10* (2013.01); *G06Q 40/08* (2013.01)

(58) Field of Classification Search
CPC ...... G06Q 40/08; G06Q 40/00; G06Q 40/025; G06Q 40/02; G06Q 50/18; G06Q 50/16
(Continued)

(56) References Cited

U.S. PATENT DOCUMENTS

| | | | | |
|---|---|---|---|---|
| 2008/0262921 | A1* | 10/2008 | Telljohann | G06Q 30/00 705/14.27 |
| 2017/0124647 | A1 | 5/2017 | Pierce et al. | |
| 2017/0232300 | A1* | 8/2017 | Tran | G16H 20/30 434/247 |

(Continued)

FOREIGN PATENT DOCUMENTS

| | | |
|---|---|---|
| CN | 107944887 | 4/2018 |
| CN | 108399567 | 8/2018 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Hao Fu
(74) *Attorney, Agent, or Firm* — Fish & Richardson P.C.

(57) ABSTRACT

Disclosed herein are methods, systems, and apparatus, including computer programs encoded on computer storage media, for handling blockchain-based loan application. One of the methods includes: obtaining a loan application sent by the client device of the loan applicant, wherein the loan application comprises identity information of the loan applicant for identity authentication; determining that the loan application is approvable based on the identity information; performing a loan issuance logic to issue a loan to the loan applicant with a loan amount according to the loan application; and sending a request to one or more blockchain nodes of the blockchain network to store a transaction record of the loan to a blockchain, wherein the transaction record includes the identity information and the loan amount.

12 Claims, 4 Drawing Sheets

(51) Int. Cl.
*G06F 16/23* (2019.01)
*G06F 9/50* (2006.01)
*G06Q 40/08* (2012.01)

(58) Field of Classification Search
USPC .......................................................... 705/38
See application file for complete search history.

(56) References Cited

U.S. PATENT DOCUMENTS

2019/0034922 A1\* 1/2019 Castinado ............ G06Q 20/389
2019/0114706 A1 4/2019 Bell et al.
2019/0333142 A1\* 10/2019 Thomas ............... G06Q 40/025
2020/0074477 A1\* 3/2020 Lamba .................... G06F 16/27
2020/0098040 A1\* 3/2020 Ben-Natan ........... G06Q 40/025
2020/0119925 A1\* 4/2020 Wang ................. G06Q 20/3827

FOREIGN PATENT DOCUMENTS

| CN | 108898478 | 11/2018 |
| CN | 109509078 | 3/2019 |
| CN | 109584043 | 4/2019 |
| CN | 110135981 | 8/2019 |
| CN | 110275925 | 9/2019 |
| CN | 110333948 | 10/2019 |

OTHER PUBLICATIONS

Nakamoto, "Bitcoin: A Peer-to-Peer Electronic Cash System," www.bitcoin.org, 2005, 9 pages.
International Search Report and Written Opinion in PCT Appln. No. PCT/CN2020/071600, dated Apr. 15, 2020, 10 pages (full machine translation).

\* cited by examiner

VIRTUAL RESOURCE ALLOCATION METHOD AND DEVICE BASED ON BLOCKCHAIN

CROSS-REFERENCE TO RELATED APPLICATIONS

This application is a continuation of PCT Application No. PCT/CN2020/071600, filed on Jan. 11, 2020, which claims priority to Chinese Patent Application No. 201910502645.8, filed on Jun. 11, 2019, and each application is hereby incorporated by reference in its entirety.

TECHNICAL FIELD

The present specification relates to the field of data processing technologies, and in particular, to virtual resource allocation methods and devices based on a blockchain.

BACKGROUND

Virtual resource allocation is a common concept in the field of computer application technologies. The virtual resource allocation can be virtual resource allocation within one device or resource scheduling between multiple devices. In these application scenarios, "resources" are usually limited, and a resource requirement of a resource requester may be greater than a total quantity of resources actually owned by the resource requester. However, a resource provider may still have a large quantity of "idle" resources. Therefore, how to properly schedule the "idle" resources of the resource provider to improve resource utilization as much as possible has always been an important direction that researchers pay attention to.

A blockchain technology, also referred to as a distributed ledger technology, is an emerging technology that several computing devices jointly participate in "accounting" to maintain a complete distributed database. The blockchain technology is characterized by decentralization, openness, and transparency, and also, in the blockchain technology, each computing device can participate in database recording, and data can be synchronized rapidly between the computing devices. Therefore, the blockchain technology has been widely applied to many fields.

SUMMARY

In view of this, one or more implementations of the present specification provide virtual resource allocation methods and devices based on a blockchain and a computer device.

To achieve the previous objective, one or more implementations of the present specification provide a virtual resource allocation method based on a blockchain, applied to a blockchain network system including a network node of a resource provider and a client of a resource requester, where the client of the resource requester is communicatively connected to the network node of the resource provider, and the method is performed by the network node of the resource provider, and includes the following: obtaining a resource allocation application sent by the client of the resource requester, where the resource allocation application includes identity authentication information of the resource requester; performing resource allocation review based on the resource allocation application; executing resource allocation logic after the resource allocation review succeeds; and sending at least one evidence storage transaction to the blockchain, where the at least one evidence storage transaction includes evidence storage data of the identity authentication information of the resource requester and evidence storage data of a first quantity of virtual resources allocated to the resource requester by the resource provider.

In another shown implementation, the at least one evidence storage transaction further includes evidence storage data of a second quantity of virtual resources that should be returned to the resource provider by the resource requester and a second time limit.

In still another shown implementation, the at least one evidence storage transaction further includes evidence storage data of return information, and the return information is used to prove that the resource requester has returned a second quantity of virtual resources within the second time limit.

Correspondingly, one or more implementations of the present specification further provide a financing loan method based on a blockchain, applied to a blockchain network system including a network node of a financial institution and a client of a loan requester, where the network node of the financial institution is communicatively connected to the client of the loan requester, and the method is performed by the network node of the financial institution, and includes the following: obtaining a loan application sent by the client of the loan requester, where the loan application includes identity authentication information of the loan requester; performing loan grant review based on the loan application; executing loan grant logic after the loan grant review succeeds; and sending at least one evidence storage transaction to the blockchain, where the at least one evidence storage transaction includes evidence storage data of the identity authentication information of the loan requester and evidence storage data of a first quantity of loans granted to the loan requester by the financial institution.

In another shown implementation, the executing loan grant logic includes one or more of granting a first quantity of loans to the loan requester, sending a notification of granting a first quantity of loans to the loan requester, and signing a loan contract including an agreement of sending a first quantity of loans to the loan requester.

In still another shown implementation, the at least one evidence storage transaction further includes evidence storage data of a loan contract signed between the loan requester and the financial institution, the loan contract includes a second quantity of loans that should be repaid to the financial institution by the loan requester and a second time limit, and the second quantity is not less than the first quantity.

In still another shown implementation, the at least one evidence storage transaction further includes evidence storage data of repayment information, and the repayment information is used to prove that the loan requester has repaid a second quantity of loans within the second time limit.

In still another shown implementation, the blockchain network system further includes a network node of a judicial institution, and the method further includes the following: obtaining, by the network node of the judicial institution, the at least one evidence storage transaction from a distributed database of the blockchain; receiving original evidence information that is sent by the network node of the financial institution and corresponds to the at least one evidence storage transaction; and executing judicial decision logic based on the at least one evidence storage transaction and the original evidence information.

In still another shown implementation, the executing judicial decision logic includes the following: sending a judicial decision evidence storage transaction to the blockchain, where the judicial decision evidence storage transaction includes evidence storage data of a judicial decision, and the judicial decision includes decision information that the loan requester is required to repay a third quantity of loans to the financial institution within a third time period.

In still another shown implementation, the blockchain network system further includes a network node of an insurance agency, a loan repayment insurance contract is signed between the financial institution and the insurance agency, and the method further includes the following: obtaining, by the network node of the insurance agency, the judicial decision evidence storage transaction from the distributed database of the blockchain; and executing claim advancement logic specified in the loan repayment insurance contract based on the judicial decision evidence storage transaction.

In still another shown implementation, the blockchain is a consortium blockchain, and the network node of the financial institution is a consortium member network node.

Correspondingly, the present specification further provides a virtual resource allocation device based on a blockchain, applied to a blockchain network system including a network node of a resource provider and a client of a resource requester, where the client of the resource requester is communicatively connected to the network node of the resource provider, and the device is applied to the network node of the resource provider, and includes the following: an acquisition unit, configured to obtain a resource allocation application sent by the client of the resource requester, where the resource allocation application includes identity authentication information of the resource requester; a review unit, configured to perform resource allocation review based on the resource allocation application; an execution unit, configured to execute resource allocation logic after the resource allocation review succeeds; and a sending unit, configured to send at least one evidence storage transaction to the blockchain, where the at least one evidence storage transaction includes evidence storage data of the identity authentication information of the resource requester and evidence storage data of a first quantity of virtual resources allocated to the resource requester by the resource provider.

In another shown implementation, the at least one evidence storage transaction further includes evidence storage data of a second quantity of virtual resources that should be returned to the resource provider by the resource requester and a second time limit.

In still another shown implementation, the at least one evidence storage transaction further includes evidence storage data of return information, and the return information is used to prove that the resource requester has returned a second quantity of virtual resources within the second time limit.

Correspondingly, the present specification further provides a financing loan device based on a blockchain, applied to a blockchain network system including a network node of a financial institution and a client of a loan requester, where the network node of the financial institution is communicatively connected to the client of the loan requester, and the device is applied to the network node of the financial institution, and includes the following: an acquisition unit, configured to obtain a loan application sent by the client of the loan requester, where the loan application includes identity authentication information of the loan requester; a review unit, configured to perform loan grant review based on the loan application; an execution unit, configured to execute loan grant logic after the loan grant review succeeds; and a sending unit, configured to send at least one evidence storage transaction to the blockchain, where the at least one evidence storage transaction includes evidence storage data of the identity authentication information of the loan requester and evidence storage data of a first quantity of loans granted to the loan requester by the financial institution.

In another shown implementation, the execution unit is further configured to perform one or more of granting a first quantity of loans to the loan requester, sending a notification of granting a first quantity of loans to the loan requester, and signing a loan contract including an agreement of sending a first quantity of loans to the loan requester.

In still another shown implementation, the at least one evidence storage transaction further includes evidence storage data of a loan contract signed between the loan requester and the financial institution, the loan contract includes a second quantity of loans that should be repaid to the financial institution by the loan requester and a second time limit, and the second quantity is not less than the first quantity.

In still another shown implementation, the at least one evidence storage transaction further includes evidence storage data of repayment information, and the repayment information is used to prove that the loan requester has repaid a second quantity of loans within the second time limit.

In still another shown implementation, the blockchain is a consortium blockchain, and the network node of the financial institution is a consortium member network node.

Correspondingly, the present specification further provides a computer device, including a storage and a processor, where the storage stores a computer program that can be run by the processor, and the resource allocation method performed by the network node of the resource provider is performed when the processor runs the computer program.

Correspondingly, the present specification further provides a computer device, including a storage and a processor, where the storage stores a computer program that can be run by the processor, and the financing loan method performed by the network node of the financial institution is performed when the processor runs the computer program.

It can be seen from the previous technical solutions that, according to the virtual resource allocation methods and devices based on the blockchain provided in the present specification, a virtual resource allocation service is provided to a resource requester, and evidence that a resource provider allocates a virtual resource to the resource requester is stored based on a blockchain tamper-resistance mechanism. Therefore, not only utilization of idle resources of the resource provider can be improved, but also labor costs of initiating virtual resource allocation to the resource provider can be reduced.

When the technical solutions provided in the present specification are applied to a financing loan scenario, a loan request user can apply for a loan to a financial institution online, and evidence that the financial institution grants a loan to the loan requester is stored based on a blockchain tamper-resistance mechanism. Therefore, not only idle fund utilization of the financial institution is improved, but also labor costs of applying for a loan to an insurance agency are reduced.

DESCRIPTION OF IMPLEMENTATIONS

Figure 1:
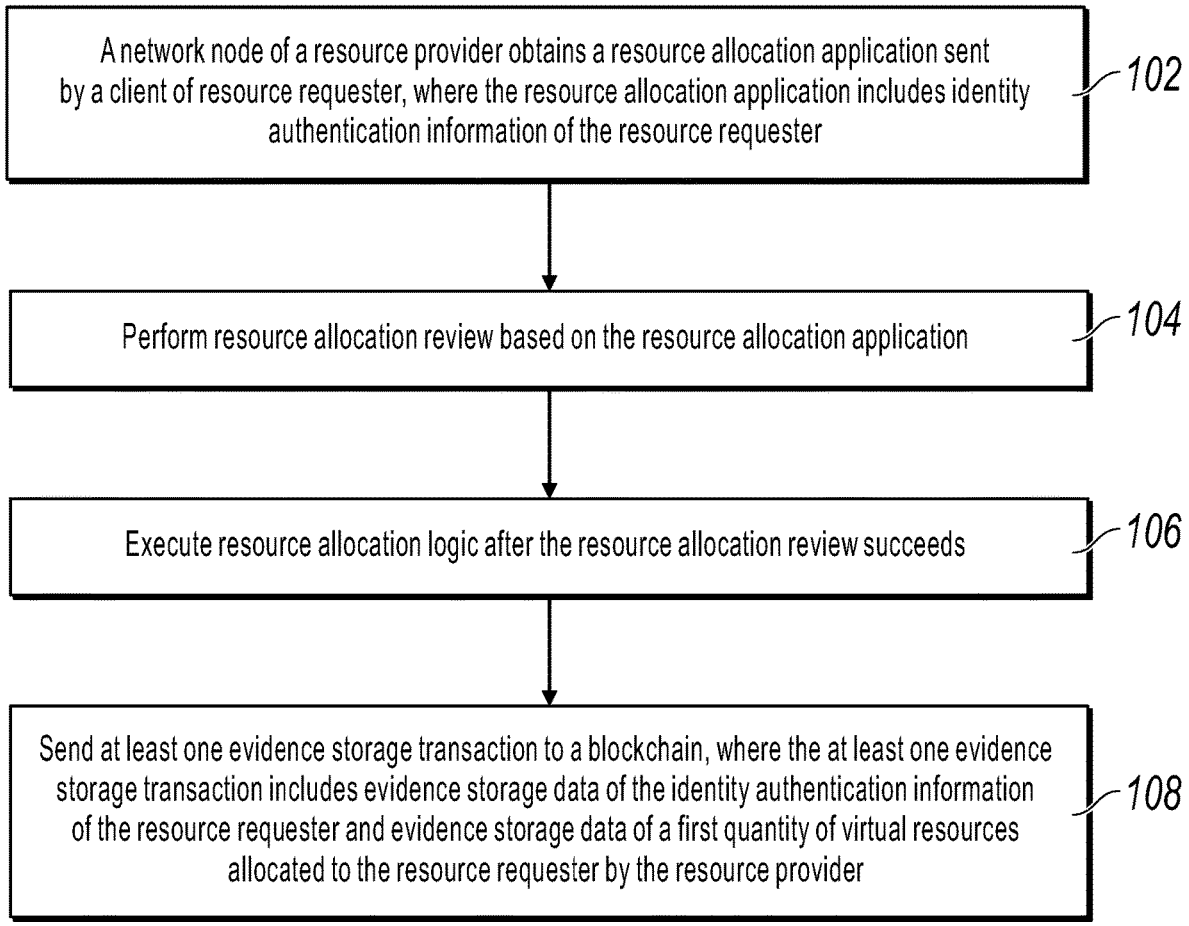
FIG. 1 is a schematic flowchart illustrating a virtual resource allocation method based on a blockchain, according to an implementation provided in the present specification.

Example implementations are described in detail here, and examples of the example implementations are presented in the accompanying drawings. When the following description relates to the accompanying drawings, unless specified otherwise, the same numbers in different accompanying drawings represent same or similar elements. Implementations described below do not represent all implementations consistent with one or more implementations of the present specification. On the contrary, the implementations are only examples of devices and methods that are described in the appended claims in detail and consistent with some aspects of one or more implementations of the present specification.

It is worthwhile to note that in other implementations, steps of a corresponding method are not necessarily performed according to the sequence shown and described in the present specification. In some other implementations, the method can include more or less steps than those described in the present specification. In addition, a single step described in the present specification may be divided into a plurality of steps in other implementations for description. Also, a plurality of steps described in the present specification may also be combined into a single step for description in other implementations.

In practice, a virtual resource requirement of a resource requester may be greater than a total quantity of resources actually owned by the resource requester, but a resource provider may still have a large quantity of "idle" resources. Therefore, how to properly schedule the "idle" resources of the resource provider is very important to improving resource utilization of the resource provider.

For example, in an application scenario of financing loans in the financial field, the "virtual resource" can refer to funds used for loan, the "resource provider" can be a financial institution such as a bank, a licensed microfinance institution, or a consumer financial institution, the "resource requester" can be an individual or organization entity that applies for a credit loan or a consumer loan from a financial institution based on an individual credit.

In view of this, in an implementation shown in the present specification, a virtual resource allocation method based on a blockchain is provided and is applied to a blockchain network system including a network node of a resource provider and a client of a resource requester.

The blockchain network described in one or more implementations of the present specification can be a peer-to-peer (P2P) network system with a distributed data storage structure that is implemented by network nodes through a consensus mechanism. Data in the blockchain is distributed in "blocks" connected in time. A current block includes a data digest of a previous block, and data of all or some of the nodes is backed up based on different specific consensus mechanisms (e.g., proof of work (POW), proof of stake (POS), delegated proof of stake (DPOS), or practical byzantine fault tolerance (PBFT)). A person skilled in the art knows that as a blockchain network system runs in a corresponding consensus mechanism, data that has been recorded into a blockchain database is difficult to be tampered with by any node. For example, in a blockchain network using a PoW consensus, existing data can be tampered with by attack with at least 51% hash power of the entire network. Therefore, the blockchain system has the characteristics of ensuring data security and preventing attack and tampering over other centralized database systems. It can be seen that data recorded into a distributed database of the blockchain cannot be attacked or tampered with, thereby ensuring authenticity and reliability of data information stored in the distributed database of the blockchain.

For example, blockchain networks can include a public blockchain network, a private blockchain network, and a consortium blockchain network. Although the term "blockchain network" is usually associated with a bitcoin cryptocurrency network, the blockchain network used here can be a distributed ledger system (DLS) that does not refer to any particular case.

In the public blockchain network, a consensus process is controlled by nodes in a consensus network. For example, hundreds, thousands, and even millions of entities can collaborate in the public blockchain network, with each entity operating at least one node in the public blockchain network. Therefore, the public blockchain network can be considered as a public network relative to participating entities. For example, the public blockchain network includes a bitcoin network. The bitcoin network is a peer-to-peer payment network. The bitcoin network uses a distributed ledger, which is referred to as a blockchain. However, as described above, the term "blockchain" usually refers to a distributed ledger that does not specifically refer to a bitcoin network.

Generally, the public blockchain network supports public transactions. Public transactions are shared by nodes in the public blockchain network and stored in a global blockchain. The global blockchain is a blockchain replicated across all nodes. In other words, for the global blockchain, nodes are in a fully consistent state. To reach a consensus (e.g., to agree to add a block to a blockchain), a consensus protocol is used in the public blockchain network. Example consensus protocols include but are not limited to proof-of-work (PoW) implemented in the bitcoin network.

Generally, the private blockchain network is provided to a specific entity, and the specific entity centrally controls read and write permission. The entity controls which nodes can participate in the blockchain network. Therefore, the private blockchain network is usually referred to as a licensing network, which imposes restrictions on who is allowed to participate in the network and a participation level (e.g., only in some transactions). Various types of access control mechanisms can be used (e.g., existing participants vote to add new entities and regulators can control access).

Generally, the consortium blockchain network is private for participating entities. In the consortium blockchain network, a consensus process is controlled by a group of authorized nodes (consortium member nodes), and one or more nodes are operated by a corresponding entity (e.g., an enterprise). For example, a consortium of 10 entities (e.g., enterprises) can operate the consortium blockchain network, and each entity operates at least one node in the consortium blockchain network. Therefore, the consortium blockchain network can be considered a private network for participating entities. In some examples, each entity (node) must sign each block, so that the block is valid and a valid block is added to a blockchain. In some examples, subsets of at least entities (nodes) (e.g., at least seven entities) must sign each block, so that the block is valid and a valid block is added to a blockchain.

It can be expected that the implementations provided in the present specification can be implemented in any suitable type of blockchain network.

A node (or a network node) described in one or more implementations of the present specification can be added to the blockchain network as a node in the blockchain network by following a corresponding node protocol through installation performed by running a node protocol program. A person skilled in the art usually refers to a network node with full backup of data of a distributed database of a blockchain as a full node, a network node with partial backup of data (e.g., data of only a block header) of the distributed database of the blockchain as a light node, etc. In one or more implementations of the present specification, a node type of the network node of the resource provider is not limited, and a quantity of network nodes of the resource provider is not limited, either. The resource provider can correspond to one end-user device or server, or can correspond to a plurality of end-user devices or servers, so that the end-user device or the server is used as a network node in the blockchain network.

In one or more implementations provided in the present specification, the resource requester user runs a client installment program on an end-user device, so that the client is added to the blockchain network, and the client installment program can be an installment program of a blockchain network node. Correspondingly, the user client also serves as a network node in the blockchain network, and initiates a data acquisition request to a neighboring network node (e.g., the network node of the resource provider) when backing up the distributed database of the blockchain, or publishes data to the blockchain by broadcasting data to a neighboring network node. Or, the client installment program can be an access-controlled blockchain user client program connected to a consortium member network node (e.g., the network node of the resource provider) in a consortium blockchain network. Correspondingly, because the client does not have permission to directly access the distributed database of the blockchain, the client is usually not used as a node in the blockchain network, and needs to send a data request for access permission to one or more consortium member nodes connected to the client. Whether the client of the resource requester is a network node in the blockchain network is not limited in the present specification.

The "virtual resource" mentioned in one or more implementations of the present specification can include a resource form needed for running a computer, and can also include a resource form needed for an entity corresponding to the computer, for example, an intelligent asset in the blockchain such as a token or a digital asset, or an offchain asset such as cash, a security, a coupon, or a real estate off the blockchain network. This is not limited in the present specification.

FIG. 1 shows a virtual resource allocation method based on a blockchain that is performed by a network node of a resource provider, according to an implementation.

102: Receive a resource allocation application sent by a client of a resource requester, where the resource allocation application includes identity authentication information of the resource requester.

The resource requester needs a certain quantity of virtual resources based on a resource configuration requirement of the resource requester, and sends the resource allocation application to the resource provider. Based on different specific ways of sending the resource allocation application by the client of the resource requester, the network node of the resource provider obtains the resource allocation application in different ways. The client of the resource requester can directly send the resource allocation application to the network node of the resource provider, and correspondingly, the network node of the resource provider directly receives the resource allocation application sent by the client of the resource requester. When the client of the resource requester servers as a network node in the blockchain network, the client of the resource requester can send the resource allocation application to a distributed database of the blockchain, and correspondingly, the network node of the resource provider backs up the distributed database of the blockchain, to obtain the resource allocation application sent by the client of the resource requester from the distributed database of the blockchain.

The resource allocation application includes the identity authentication information of the resource requester, including information data that can identify the resource requester, for example, identity certificate information, IP address information, and hardware address information.

104: Perform resource allocation review based on the resource allocation application.

The resource allocation review can include verification review of the identity authentication information of the resource requester, so as to determine whether an identity of the resource requester is authentic and valid or satisfies user rights specified in a resource allocation criterion of the resource provider.

106: Execute resource allocation logic after the resource allocation review succeeds.

When it is determined through review that the identity of the resource requester is authentic and valid or satisfies the user rights specified in the resource allocation criterion of the resource provider, the resource provider can execute the resource allocation logic for the resource requester. The resource allocation logic can include the following: transferring a first quantity of virtual resources to the resource requester through the blockchain network or another offline (other than the blockchain network) channel; or notifying the resource requester that a first quantity of virtual resources can be transferred to the resource requester through the blockchain network or another offline (other than the blockchain network) channel; or performing a service process such as signing a resource allocation contract with the resource requester.

A specific way of allocating the first quantity of virtual resources to the resource requester by the resource provider is not limited in the present specification. The first quantity of virtual resources can be directly transmitted by using the end-user devices of the two parties, for example, a transfer transaction from an account of the resource provider to an account of the resource requester is conducted in the blockchain network, to transfer blockchain digital tokens whose value is equal to the first quantity of virtual resources. Or, the first quantity of virtual resources can be transferred from the resource provider to the resource requester off the blockchain network.

A specific way of sending the resource allocation notification by the network node of the resource provider is not limited in the present specification. For example, the network node of the resource provider can be directly communicatively connected to the client of the resource requester to send the resource allocation notification to the client of the resource requester. When the client of the resource requester serves as a node in the blockchain network, the network node of the resource provider can send the resource allocation notification to the distributed database of the blockchain, and correspondingly, the client of the resource requester can obtain the resource allocation notification from the distributed database of the blockchain.

108: Send at least one evidence storage transaction to the blockchain, where the at least one evidence storage transaction includes evidence storage data of the identity authentication information of the resource requester and evidence storage data of a first quantity of virtual resources allocated to the resource requester by the resource provider.

The transaction described in one or more implementations of the present specification refers to a piece of data that is created by a network node in the blockchain network and ultimately needs to be published to the distributed database of the blockchain. Transactions in the blockchain include a transaction in a narrow sense and a transaction in a broad sense. The transaction in the narrow sense refers to a value transfer published by a user to the blockchain. For example, in a conventional bitcoin blockchain network, the transaction can be a transfer initiated by the user in the blockchain. The transaction in the broad sense refers to service data with a service intention that is published by a user to the blockchain by using a node. The at least one evidence storage transaction described in this implementation can include originals or ciphertexts of the identity authentication information of the resource requester and the first quantity of virtual resources allocated to the resource requester by the resource provider as evidence storage data, or can include "digital fingerprints" of the identity authentication information of the resource requester and the first quantity of virtual resources allocated to the resource requester by the resource provider. In other words, a hash digest of the identity authentication information of the resource requester and a hash digest of the first quantity of virtual resources allocated to the resource requester by the resource provider are used as evidence storage data, so that evidence is stored for the identity authentication information of the resource requester and the quantity of allocated virtual resources based on a blockchain tamper-resistance mechanism.

The evidence storage data of the identity authentication information of the resource requester and the evidence storage data of the first quantity of virtual resources allocated to the resource requester by the resource provider can be included in one evidence storage transaction sent by the network node of the resource provider, or can be included in a plurality of evidence storage transactions sent by the network node of the resource provider, which is not limited in this implementation.

In another shown implementation, to return a second quantity of virtual resources to the resource provider within a second time limit after the resource requester obtains the first quantity of virtual resources, the at least one evidence storage transaction sent by the network node of the resource provider further includes evidence storage data of a second quantity of virtual resources that should be returned to the resource provider by the resource requester and the second time limit.

In still another shown implementation, after the resource requester returns the second quantity of virtual resources within the second time limit, the at least one evidence storage transaction further includes evidence storage data of return information, and the return information is used to prove that the resource requester has returned the second quantity of virtual resources within the second time limit.

The network node of the resource provider uploads the information about the to-be-returned resources of the resource requester or the information about the returned resources of the resource requester to the distributed database of the blockchain for evidence storage in the form of the evidence storage transaction, to provide data evidence support for possible resource allocation or return disputes.

A detailed process of recording the evidence storage transaction in the previous implementation into the distributed database of the blockchain can be specifically set based on a verification mechanism and a consensus mechanism of the blockchain. In a shown implementation, the uploading the evidence storage transaction to the distributed database of the blockchain includes the following: adding the evidence storage transaction to a candidate block after nodes with accounting rights in the blockchain network verify the evidence storage transaction; determining a consensus accounting node satisfying the blockchain consensus mechanism from the nodes with accounting rights; broadcasting, by the consensus accounting node, the candidate block to nodes in the blockchain network; and adding the candidate block to the distributed database of the blockchain after the candidate block is verified by a predetermined quantity of nodes in the blockchain network, where the candidate block is considered as the latest block.

In the previous implementation, the nodes with accounting rights are nodes with permission to generate a candidate block. Based on the consensus mechanism of the blockchain, the consensus accounting node can be determined from the nodes with accounting rights for the candidate block. The consensus mechanism can include PBFT commonly used in a consortium blockchain network, POW, POS, DPOS, etc.

In actual service applications, the blockchain network described in the one or more implementations of the present specification can be constructed as a consortium blockchain network, and the network node of the resource provider, as a consortium member network node, sends the at least one evidence storage transaction in the consortium blockchain network. Compared with a public blockchain network, a consensus algorithm used in the consortium blockchain network is usually efficient, and can satisfy a requirement of a large quantity of transactions, for example, evidence storage transactions frequently generated by sending resource allocation applications by a large quantity of clients of resource requesters. Further, a consensus delay is very low, and therefore, a real-time processing requirement is basically satisfied, and the evidence storage transaction can be rapidly recorded into a newly generated block of the blockchain in real time. In addition, a trusted node (e.g., a resource provider or a node corresponding to a government agency) in the consortium blockchain network is used as a preselected accounting node, which takes into account security and stability. Moreover, a consensus algorithm (e.g., PBFT) of the consortium blockchain network usually does not consume excessive computer power resources, and does not necessarily need currency circulation. Therefore, the consensus algorithm can be well used.

According to the virtual resource allocation method described in the one or more implementations, through a blockchain network system architecture, a resource requester and a resource provider can complete virtual resource allocation application, review, and allocation online, and store evidence in a blockchain for a process or a result of the virtual resource application and allocation, so that virtual resources of the resource provider and the resource requester are properly configured, resource utilization is improved, and data evidence support is provided for possible resource allocation disputes.

In the field of financial technology, an application scenario where a financial institution performs financing loan for a loan requester user is used as an example to describe the technical solution of the present application in detail.

As described above, in this application scenario, the "virtual resource" can refer to funds or negotiable securities used for loan, the "virtual resource allocation" can refer to loan grant, the "resource requester" can be an individual or organization user with a loan requirement, and the "resource provider" can be a financial institution such as a bank, a licensed microfinance institution, or a consumer financial institution.

Correspondingly, another implementation of the present specification provides a financing loan method based on a blockchain, applied to a blockchain network system including a network node of a financial institution and a client of a loan requester, where the network node of the financial institution is communicatively connected to the client of the loan requester.

Background knowledge of a blockchain network can be obtained in the previous implementation. It can be expected that the implementations provided in the present specification can be implemented in any suitable type of blockchain network.

A node (or a network node) described in one or more implementations of the present specification can be added to the blockchain network as a node in the blockchain network by following a corresponding node protocol through installation performed by running a node protocol program. A person skilled in the art usually refers to a network node with full backup of data of a blockchain distributed database as a full node, a network node with partial backup of data (e.g., data of only a block header) of a blockchain distributed database as a light node, etc. In one or more implementations of the present specification, a node type of the network node of the financial institution is not limited, and a quantity of network nodes of the financial institution is not limited, either. The financial institution can correspond to one end-user device or server, or can correspond to a plurality of end-user devices or servers, so that the end-user device or the server is used as a network node in the blockchain network.

In one or more implementations provided in the present specification, the loan requester user runs a client installment program on an end-user device, so that the client is added to the blockchain network, and the client installment program can be an installment program of a blockchain network node. Correspondingly, the user client also serves as a network node in the blockchain network, and initiates a data acquisition request to a neighboring network node (e.g., the network node of the financial institution) when backing up the distributed database of the blockchain, or publishes data to the blockchain by broadcasting data to a neighboring network node. Or, the client installment program can be an access-controlled blockchain user client program connected to a consortium member network node (e.g., the network node of the financial institution) in a consortium blockchain network. Correspondingly, because the client does not have permission to directly access the distributed database of the blockchain, the client is usually not used as a node in the blockchain network, and needs to send a data request for access permission to one or more consortium member nodes connected to the client. Whether the client of the loan requester is a network node in the blockchain network is not limited in the present specification.

Figure 2:
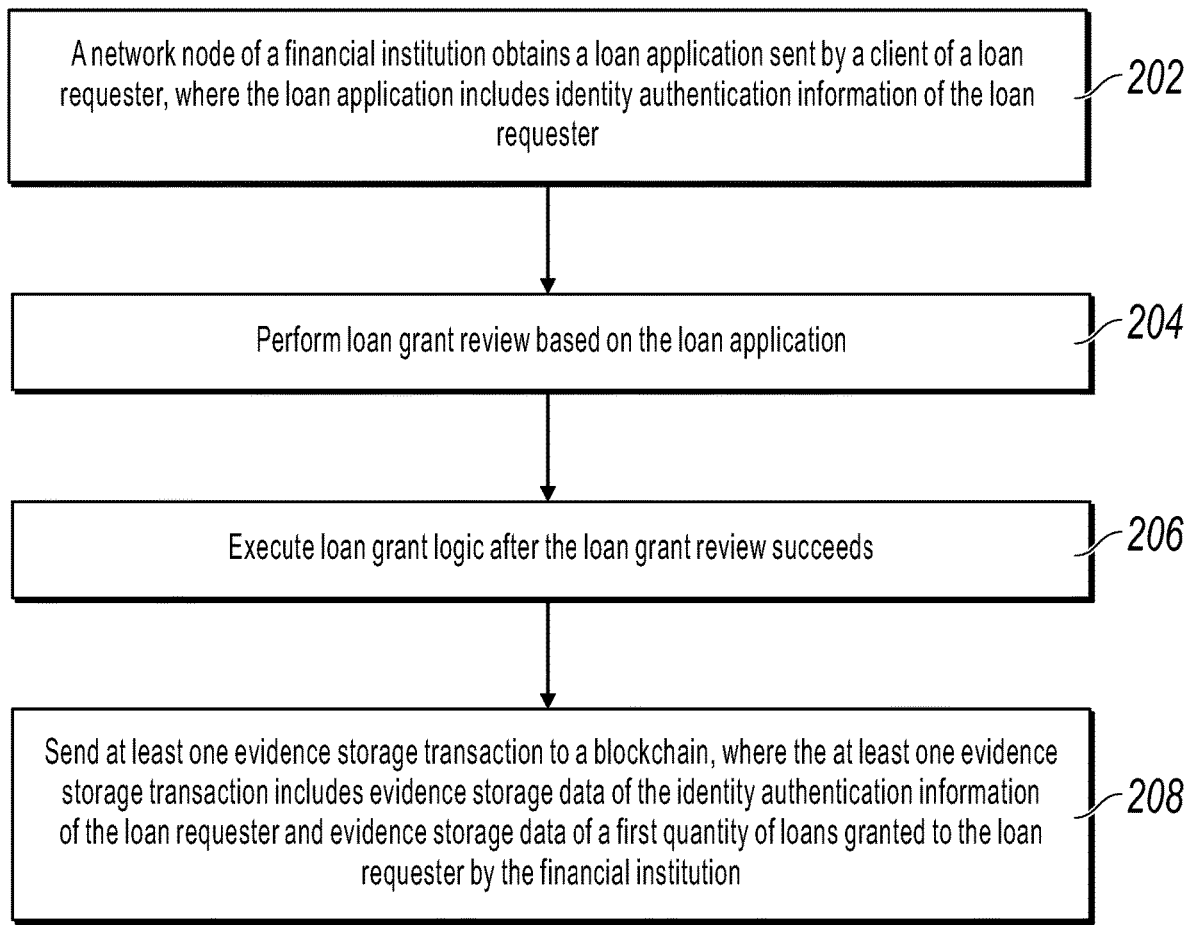
FIG. 2 is a schematic flowchart illustrating a financing loan method based on a blockchain, according to an implementation provided in the present specification.

FIG. 2 shows a financing loan method based on a blockchain that is performed by a network node of a financial institution, according to an implementation.

202: Obtain a loan application sent by a client of a loan requester, where the loan application includes identity authentication information of the loan requester.

To make the financial institution have more trust in the loan requester user and to help the financial institution perform online loan grant review, the loan application sent by the loan requester user can include the identity authentication information of the loan requester, where the identity authentication information can include real name identity information or biological identification information (e.g., facial recognition information, fingerprint information, and voiceprint information) of the user, identity information of an enterprise organization, biological identification information of a person in charge of an enterprise organization, or electronic identity authentication information (e.g., an identity certificate issued by the CA authority to a user) of an individual or an organization user, so that the financial institution can perform loan grant review such as identity-based credit review based on a real identity of the loan requester user, and labor costs needed for offline identity review are saved.

In this implementation provided in the present specification, the client of the loan requester can be directly communicatively connected to the financial institution to send the loan application to the financial institution. When the client of the loan requester serves as a node in the blockchain network, the client of the loan requester can send the loan application to a distributed database of the blockchain, and correspondingly, the network node of the financial institution can obtain the loan application from the distributed database of the blockchain.

204: Perform loan grant review based on the loan application.

The financial institution usually sets a predetermined loan grant review service process for the loan application of the user, and the loan grant review process is usually performed based on identity information of the loan requester user, for example, credit review, identity authenticity review, user right review, and loan quota review of the loan requester user. The user right review can include detecting whether the user is a blacklisted user predetermined by the financial institution or a loan-banned industry user based on the identity information of the user.

The loan grant review process can be performed by an executable program set by the network node of the financial institution, or a staff of the financial institution can perform review and then enter a conclusion about whether the review succeeds in the network node of the financial institution. Implementations are not limited here.

206: Execute loan grant logic after the loan grant review succeeds.

After the loan grant review succeeds, for example, it is determined through review that the identity of the loan requester is authentic and valid or satisfies user rights specified for loans of the financial institution or an industry feature, the financial institution can execute the loan grant logic for the loan requester. The loan grant logic can include the following: sending a first quantity of loans to the loan requester through the blockchain network or another offline (other than the blockchain network) channel; or sending a loan notification to the loan requester through the blockchain network or another offline (other than the blockchain network) channel, to notify that a first quantity of loans can be granted to the loan requester; or performing a service process such as signing a loan contract including an agreement of sending a first quantity of loans to the loan requester.

A specific way of granting the first quantity of loans to the loan requester by the financial institution is not limited in the present specification. A transfer of loan funds or other negotiable securities or digital tokens whose value is equal to the first quantity of loan funds can be made by using user accounts of the two parties. For example, a transfer transaction from a blockchain user account of the financial institution to an account of the loan requester is directly conducted in the blockchain network, to transfer blockchain digital tokens whose value is equal to the first quantity of loans. Or, the first quantity of loans can be granted to the loan requester by the financial institution off the blockchain network (e.g., a transfer between bank accounts).

A specific way of sending the loan notification by the network node of the financial institution is not limited in the present specification. For example, the network node of the financial institution can be directly communicatively connected to the client of the loan requester to send the loan notification to the client of the loan requester. When the client of the loan requester serves as a node in the blockchain network, the network node of the financial institution can send the loan notification to the distributed database of the blockchain, and correspondingly, the client of the loan requester can obtain the loan notification from the distributed database of the blockchain. As such, the loan requester user is notified, and evidence for the loan notification is also stored in the blockchain.

The loan grant logic can further include a service process of signing a loan contract between the financial institution and the loan requester. A person skilled in the art should know that the loan contract can include identity information of the borrower and the lender, a loan limit (the first quantity), a loan grant time, a repayment limit (a second quantity), a repayment time limit (a second time limit), etc. The loan contract is signed on the end-user devices of the two parties, so that the loan grant logic is executed efficiently and cost-effectively.

208: Send at least one evidence storage transaction to the blockchain, where the at least one evidence storage transaction includes evidence storage data of the identity authentication information of the loan requester and evidence storage data of a first quantity of loans granted to the loan requester by the financial institution.

The evidence storage data of the identity authentication information of the loan requester can include an original or a ciphertext of the identity authentication information of the loan requester or a hash digest of the identity authentication information of the loan requester. The evidence storage data of the first quantity of loans granted to the loan requester by the financial institution can include an original or a ciphertext of the first quantity or a hash digest of the first quantity. The evidence storage data of the identity authentication information of the loan requester and the evidence storage data of the first quantity can be sent to the blockchain by the network node of the financial institution in one evidence storage transaction or in a plurality of evidence storage transactions.

In another shown implementation, to repay a second quantity of loans to the financial institution within a second time limit after the loan requester obtains the first quantity of loans, the at least one evidence storage transaction sent by the network node of the financial institution can further include evidence storage data of a second quantity of loans that should be repaid to the financial institution by the loan requester and the second time limit. The loan contract signed between the financial institution and the loan requester can include the second quantity of loans that should be repaid to the financial institution by the loan requester and the second time limit. Therefore, the at least one evidence storage transaction can further include evidence storage data of the loan contract signed between the loan requester and the financial institution, and the evidence storage data can be an original or a ciphertext of the loan contract or a hash digest of the loan contract. Based on a profit mode of the financial institution, the second quantity is usually not less than the first quantity.

In still another shown implementation, after the loan requester repays the second quantity of loans within the second time limit, the at least one evidence storage transaction sent by the network node of the financial institution to the blockchain can further include evidence storage data of repayment information. The repayment information is used to prove that the loan requester has repaid the second quantity of loans within the second time limit, and the repayment information can be represented as a transfer transaction in the blockchain, a bank transfer voucher, a transfer voucher of other assets or negotiable securities, etc.

The network node of the financial institution uploads the information (including the second quantity and the second time limit) about the to-be-repaid loans of the loan requester or the information about the repaid loans of the loan requester to the distributed database of the blockchain for evidence storage in the form of the evidence storage transaction, to provide data evidence support for possible loan grant or repayment disputes.

In still another implementation provided in the present specification, the blockchain network further includes a network node of a judicial institution. When the loan requester has not completed repayment of the second quantity of loans within the second time limit or there is another loan dispute, the financial institution can file a lawsuit to the judicial institution to request the loan requester to complete the repayment or other claims. The network node of the judicial institution obtains the at least one evidence storage transaction sent by the network node of the financial institution from the distributed database of the blockchain, receives original evidence information that is sent by the network node of the financial institution and corresponds to the at least one evidence storage transaction, and executes judicial decision logic based on the at least one evidence storage transaction and the original evidence information. Based on a correspondence between an evidence storage transaction and original evidence information (e.g., a correspondence between a hash digest of original evidence information and the original evidence information or a correspondence between an evidence information ciphertext and original evidence information) stored in the distributed database of the blockchain, the judicial institution can determine authenticity of the original evidence information, so as to provide data evidence support for the judicial decision logic executed based on the original evidence information, and reduce labor costs needed by steps such as obtaining evidence and performing notarization by a judicial officer.

The executing judicial decision logic can include the following: sending a judicial decision evidence storage transaction to the blockchain, where the judicial decision evidence storage transaction includes evidence storage data of a judicial decision, and the judicial decision includes decision information that the loan requester is required to repay a third quantity of loans to the financial institution within a third time period.

In still another shown implementation, the blockchain network system further includes a network node of an insurance agency. A loan repayment insurance contract is signed between the financial institution and the insurance agency, so that when the loan requester has not repaid the third quantity of loans to the financial institution within the third time period determined by the judicial institution, the network node of the insurance agency executes claim advancement logic specified in the loan repayment insurance contract based on the judicial decision evidence storage transaction obtained from the distributed database of the blockchain, so that the insurance agency advances the third quantity of loans to the financial institution, and the insurance agency can retain a right to reclaim the advanced funds from the loan requester.

An end-user device corresponding to at least one of the judicial institution and the insurance agency is set as a network node in the blockchain network, so that at least one of judicial guarantee and insurance guarantee can be provided for the financing loan method performed by the financial institution. As such, not only the legitimacy and compliance of the financing loan process are improved, but also costs of obtaining evidence and a bad debt risk in a judicial dispute of the financing loan are reduced, thereby playing a positive role in regulating and developing a credit loan or a consumer loan based on a user credit.

Corresponding to the previous process implementation, the implementations of the present specification further provide a virtual resource allocation device 30 based on a blockchain, and a financing loan device 40 based on a blockchain. The devices 30 and 40 can be implemented by software, hardware, or a combination of hardware and software. Software implementation is used as an example. As a logical device, the device is formed by reading a corresponding computer program instruction in a memory and running the instruction by a central processing unit (CPU) in an apparatus where the device is located. In terms of hardware implementation, in addition to a CPU, a memory, and a storage shown in FIG. 5, the apparatus where the device is located generally further includes other hardware such as a chip for sending and receiving radio signals, and/or other hardware such as a card configured to implement a network communication function.

Figure 3:
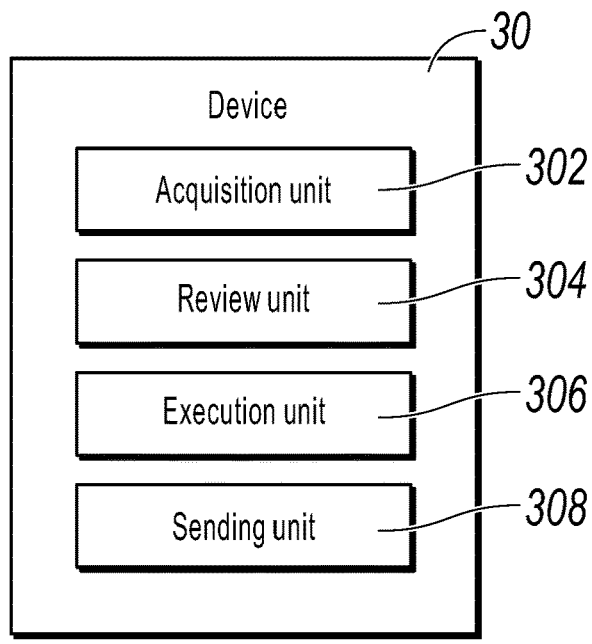
FIG. 3 is a schematic diagram illustrating a virtual resource allocation device based on a blockchain that is applied to a network node of a resource provider, according to an implementation provided in the present specification.

As shown in FIG. 3, the present specification further provides a virtual resource allocation device 30 based on a blockchain, applied to a blockchain network system including a network node of a resource provider and a client of a resource requester, where the client of the resource requester is communicatively connected to the network node of the resource provider, and the device 30 is applied to the network node of the resource provider, and includes the following: an acquisition unit 302, configured to obtain a resource allocation application sent by the client of the resource requester, where the resource allocation application includes identity authentication information of the resource requester; a review unit 304, configured to perform resource allocation review based on the resource allocation application; an execution unit 306, configured to execute resource allocation logic after the resource allocation review succeeds; and a sending unit 308, configured to send at least one evidence storage transaction to the blockchain, where the at least one evidence storage transaction includes evidence storage data of the identity authentication information of the resource requester and evidence storage data of a first quantity of virtual resources allocated to the resource requester by the resource provider.

In another shown implementation, the at least one evidence storage transaction further includes evidence storage data of a second quantity of virtual resources that should be returned to the resource provider by the resource requester and a second time limit.

In still another shown implementation, the at least one evidence storage transaction further includes evidence storage data of return information, and the return information is used to prove that the resource requester has returned a second quantity of virtual resources within the second time limit.

For a specific implementation process of functions of the units in the device 30, references can be made to an implementation process of corresponding steps in the virtual resource allocation method based on the blockchain that is performed by the network node of the resource provider. For related parts, references can be made to descriptions in the method implementation. Details are omitted here for simplicity.

Figure 4:
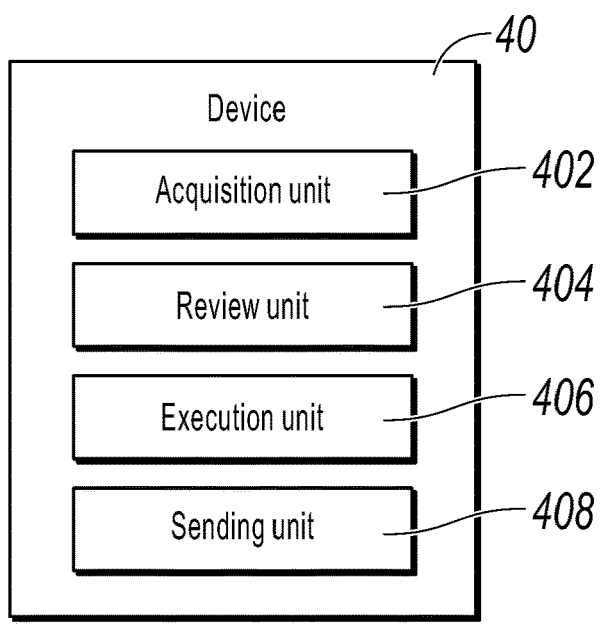
FIG. 4 is a schematic diagram illustrating a financing loan device based on a blockchain that is applied to a network node of a financial institution, according to an implementation provided in the present specification.

As shown in FIG. 4, the present specification further provides a financing loan device 40 based on a blockchain, applied to a blockchain network system including a network node of a financial institution and a client of a loan requester, where the network node of the financial institution is communicatively connected to the client of the loan requester, and the device is applied to the network node of the financial institution, and includes the following: an acquisition unit 402, configured to obtain a loan application sent by the client of the loan requester, where the loan application includes identity authentication information of the loan requester; a review unit 404, configured to perform loan grant review based on the loan application; an execution unit 406, configured to execute loan grant logic after the loan grant review succeeds; and a sending unit 408, configured to send at least one evidence storage transaction to the blockchain, where the at least one evidence storage transaction includes evidence storage data of the identity authentication information of the loan requester and evidence storage data of a first quantity of loans granted to the loan requester by the financial institution.

In another shown implementation, the execution unit 406 is further configured to perform one or more of granting a first quantity of loans to the loan requester, sending a notification of granting a first quantity of loans to the loan requester, and signing a loan contract including an agreement of sending a first quantity of loans to the loan requester.

In still another shown implementation, the at least one evidence storage transaction further includes evidence storage data of a loan contract signed between the loan requester and the financial institution, the loan contract includes a second quantity of loans that should be repaid to the financial institution by the loan requester and a second time limit, and the second quantity is not less than the first quantity.

In still another shown implementation, the at least one evidence storage transaction further includes evidence storage data of repayment information, and the repayment information is used to prove that the loan requester has repaid a second quantity of loans within the second time limit.

In still another shown implementation, the blockchain is a consortium blockchain, and the network node of the financial institution is a consortium member network node.

For a specific implementation process of functions of the units in the device 40, references can be made to an implementation process of corresponding steps in the financing loan method based on the blockchain that is performed by the network node of the financial institution. For related parts, references can be made to descriptions in the method implementation. Details are omitted here for simplicity.

The previously described device implementation is merely an example. The units described as separate parts may or may not be physically separate, and parts displayed as units may or may not be physical modules, and may be located in one position, or may be distributed on a plurality of network modules. Some or all of the units or modules can be selected based on actual requirements to achieve the objectives of the solutions of the present specification. A person of ordinary skill in the art can understand and implement the implementations of the present specification without creative efforts.

The devices, units, or modules described in the previous implementations can be implemented by a computer chip or an entity, or can be implemented by a product with a certain function. A typical implementation device is a computer, and the computer can be specifically a personal computer, a laptop computer, a cellular phone, a camera phone, a smartphone, a personal digital assistant, a media player, a navigation device, an email receiving and sending device, a game console, a tablet computer, a wearable device, or any combination of these devices.

Figure 5:
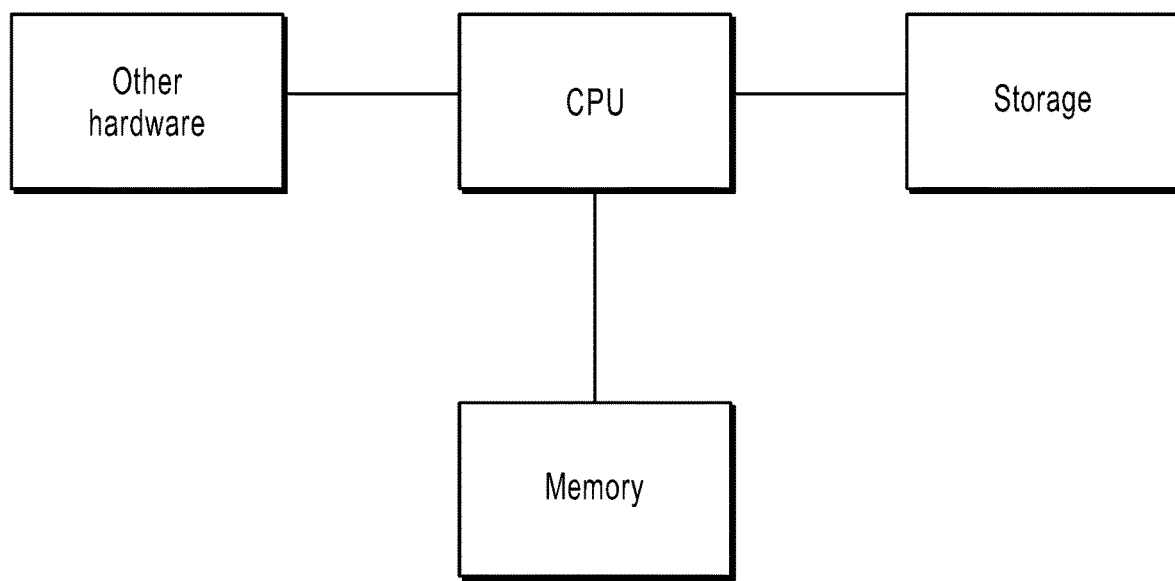
FIG. 5 is a structural diagram illustrating hardware of an implementation of a virtual resource allocation device or a financing loan device based on a blockchain, according to the present specification.

Corresponding to the previous method implementation, an implementation of the present specification further provides a computer device. As shown in FIG. 5, the computer device includes a storage and a processor. The storage stores a computer program that can be run by the processor. When running the stored computer program, the processor performs the steps of the resource allocation method performed by the network node of the resource provider in the implementation of the present specification. For detailed descriptions of the steps of the resource allocation method performed by the network node of the resource provider, references can be made to the previously described content. Details are omitted for simplicity.

Corresponding to the previous method implementation, an implementation of the present specification further provides a computer device. As shown in FIG. 5, the computer device includes a storage and a processor. The storage stores a computer program that can be run by the processor. When running the stored computer program, the processor performs the steps of the financing loan method based on the blockchain that is performed by the network node of the financial institution in the implementation of the present specification. For detailed descriptions of the steps of the financial loan method based on the blockchain that is performed by the network node of the financial institution, references can be made to the previously described content. Details are omitted for simplicity.

The previous descriptions are merely preferred implementations of the present specification, but are not intended to limit the present specification. Any modification, equivalent replacement, or improvement made without departing from the spirit and principle of the present specification shall fall within the protection scope of the present specification.

In a typical configuration, a computing device includes one or more processors (CPU), one or more input/output interfaces, one or more network interfaces, and one or more memories.

The memory can include a non-persistent memory, a random access memory (RAM), a non-volatile memory, and/or another form that are in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data.

Examples of a computer storage medium include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device or any other non-transmission medium. The computer storage medium can be used to store information accessible by the computing device. Based on the definition in the present specification, the computer-readable medium does not include transitory computer readable media (transitory media) such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that an implementation of the present specification can be provided as a method, a system, or a computer program product. Therefore, the implementations of the present specification can use a form of hardware only implementations, software only implementations, or implementations with a combination of software and hardware. Moreover, the implementations of the present specification can use a form of a computer program product that is implemented on one or more computer-usable storage media (including but not limited to a disk memory, a CD-ROM, an optical memory, etc.) that include computer-usable program code.

What is claimed is:

1. A computer-implemented method for virtual resource allocation, comprising:
   maintaining, by a blockchain node of a blockchain network, a blockchain, wherein the blockchain node is associated with a financial institution, and the blockchain node maintains the blockchain collaboratively with a judicial network node associated with a judicial institution and an insurance network node associated with an insurance agency;

wherein the blockchain node is configured with loan grant logic for performing processes for granting loans to loan applicants, the processes comprises one or more of:
- transferring the loans to the loan applicants through the blockchain network or off-the-blockchain-network channels,
- sending loan notifications to the loan applicants through the blockchain network or the off-the-blockchain-network channels, or
- performing a service process of signing loan contracts with the loan applicants, wherein the judicial network node is configured with judicial decision logic for performing processes comprising recording judicial decisions to the blockchain;

obtaining a loan application sent by a client device of a loan applicant, wherein the loan application comprises identity information of the loan applicant for identity authentication;

determining that the loan application is approvable based on the identity information of the loan applicant;

executing the loan grant logic to allocate a loan to the loan applicant with a loan amount according to the loan application, wherein the executing the loan grant logic to allocate a loan to the loan applicant comprises performing a service process of signing a loan contract with the loan applicant, and wherein the loan contract comprises a repayment amount of the loan and a repayment date;

uploading a transaction record of the loan to the blockchain for evidence storage in a form of an evidence storage transaction, wherein the transaction record includes an original or a ciphertext of one or more pieces of information of the loan contract or a hash digest of the one or more pieces of information of the loan contract, wherein the one or more pieces of information of the loan contract comprises one or more of the identity information of the loan applicant, the loan amount, a loan grant time, the repayment amount, or the repayment date;

determining that repayment of the repayment amount has not been paid completely by the loan applicant by the repayment date; and in response to determining that the repayment of the repayment amount has not been paid completely by the loan applicant by the repayment date, sending, by the blockchain node and using the off-the-blockchain-network channels, original evidence information corresponding to the evidence storage transaction to the judicial network node to be compared by the judicial institution, wherein the original evidence information is to be compared to the transaction record retrieved from the blockchain using the judicial decision logic for determining authenticity of the original evidence information, wherein the original evidence information comprises the loan contract signed by the loan applicant, wherein the original evidence information sent from the blockchain node and the transaction record retrieved from the blockchain are both input into the judicial decision logic to obtain a judicial decision on the loan, wherein the judicial decision comprises a decision that the loan applicant is required to repay the loan amount within a predetermined period of time, and wherein the judicial decision is uploaded to the blockchain for evidence storage in a form of a judicial decision transaction.

2. The computer-implemented method of claim 1, wherein the transaction record further comprises proof of repayment of the repayment amount paid on or before the repayment date.

3. The computer-implemented method of claim 1, wherein the judicial decision is retrieved by the insurance network node of the blockchain network associated with the insurance agency to execute an insurance policy for repaying the loan for the loan applicant.

4. The computer-implemented method of claim 1, wherein the blockchain network is a consortium blockchain network.

5. A computer-implemented system for virtual resource allocation, comprising:
- one or more processors of a blockchain node of a blockchain network; and
- one or more computer-readable memories coupled to the one or more processors and having instructions stored thereon that are executable by the one or more processors to perform one or more operations, comprising:
  - maintaining, by the blockchain node of the blockchain network, a blockchain, wherein the blockchain node is associated with a financial institution, and the blockchain node maintains the blockchain collaboratively with a judicial network node associated with a judicial institution and an insurance network node associated with an insurance agency;
  - wherein the blockchain node is configured with loan grant logic for performing processes for granting loans to loan applicants, the processes comprises one or more of:
    - transferring the loans to the loan applicants through the blockchain network or off-the-blockchain-network channels,
    - sending loan notifications to the loan applicants through the blockchain network or the off-the-blockchain-network channels, or
    - performing a service process of signing loan contracts with the loan applicants,
  - wherein the judicial network node is configured with judicial decision logic for performing processes comprising recording judicial decisions to the blockchain;
  - obtaining a loan application sent by a client device of a loan applicant, wherein the loan application comprises identity information of the loan applicant for identity authentication;
  - determining that the loan application is approvable based on the identity information of the loan applicant;
  - executing the loan grant logic to allocate a loan to the loan applicant with a loan amount according to the loan application, wherein the executing the loan grant logic to allocate a loan to the loan applicant comprises performing a service process of signing a loan contract with the loan applicant, and wherein the loan contract comprises a repayment amount of the loan and a repayment date;
  - uploading a transaction record of the loan to the blockchain for evidence storage in a form of an evidence storage transaction, wherein the transaction record includes an original or a ciphertext of one or more pieces of information of the loan contract or a hash digest of the one or more pieces of information of the loan contract, wherein the one or more pieces of information of the loan contract comprises one or more of the identity information of the loan applicant, the loan amount, a loan grant time, the repayment amount, or the repayment date;

determining that repayment of the repayment amount has not been paid completely by the loan applicant by the repayment date; and in response to determining that the repayment of the repayment amount has not been paid completely by the loan applicant by the repayment date, sending, by the blockchain node and using the off-the-blockchain-network channels, original evidence information corresponding to the evidence storage transaction to the judicial network node to be compared by the judicial institution, wherein the original evidence information is to be compared to the transaction record retrieved from the blockchain using the judicial decision logic for determining authenticity of the original evidence information, wherein the original evidence information comprises the loan contract signed by the loan applicant, wherein the original evidence information sent from the blockchain node and the transaction record retrieved from the blockchain are both input into the judicial decision logic to obtain a judicial decision on the loan, wherein the judicial decision comprises a decision that the loan applicant is required to repay the loan amount within a predetermined period of time, and wherein the judicial decision is uploaded to the blockchain for evidence storage in a form of a judicial decision transaction.

6. The computer-implemented system of claim 5, wherein the transaction record further comprises proof of repayment of the repayment amount paid on or before the repayment date.

7. The computer-implemented system of claim 5, wherein the judicial decision is retrieved by the insurance network node of the blockchain network associated with the insurance agency to execute an insurance policy for repaying the loan for the loan applicant.

8. The computer-implemented system of claim 5, wherein the blockchain network is a consortium blockchain network.

9. A non-transitory, computer-readable medium storing one or more instructions executable by a computer-implemented authentication system of a blockchain node of a blockchain network to perform one or more operations for virtual resource allocation, the operations comprising:

maintaining, by the blockchain node of the blockchain network, a blockchain, wherein the blockchain node is associated with a financial institution, and the blockchain node maintains the blockchain collaboratively with a judicial network node associated with a judicial institution and an insurance network node associated with an insurance agency;

wherein the blockchain node is configured with loan grant logic for performing processes for granting loans to loan applicants, the processes comprises one or more of:

transferring the loans to the loan applicants through the blockchain network or off-the-blockchain-network channels, sending loan notifications to the loan applicants through the blockchain network or the off-the-blockchain-network channels, or performing a service process of signing loan contracts with the loan applicants, wherein the judicial network node is configured with judicial decision logic for performing processes comprising recording judicial decisions to the blockchain;

obtaining a loan application sent by a client device of a loan applicant, wherein the loan application comprises identity information of the loan applicant for identity authentication;

determining that the loan application is approvable based on the identity information of the loan applicant;

executing the loan grant logic to allocate a loan to the loan applicant with a loan amount according to the loan application, wherein the executing the loan grant logic to allocate a loan to the loan applicant comprises performing a service process of signing a loan contract with the loan applicant, and wherein the loan contract comprises a repayment amount of the loan and a repayment date;

uploading a transaction record of the loan to the blockchain for evidence storage in a form of an evidence storage transaction, wherein the transaction record includes an original or a ciphertext of one or more pieces of information of the loan contract or a hash digest of the one or more pieces of information of the loan contract, wherein the one or more pieces of information of the loan contract comprises one or more of the identity information of the loan applicant, the loan amount, a loan grant time, the repayment amount, or the repayment date;

determining that repayment of the repayment amount has not been paid completely by the loan applicant by the repayment date; and in response to determining that the repayment of the repayment amount has not been paid completely by the loan applicant by the repayment date, sending, by the blockchain node and using the off-the-blockchain-network channels, original evidence information corresponding to the evidence storage transaction to the judicial network node to be compared by the judicial institution, wherein the original evidence information is to be compared to the transaction record retrieved from the blockchain using the judicial decision logic for determining authenticity of the original evidence information, wherein the original evidence information comprises the loan contract signed by the loan applicant, wherein the original evidence information sent from the blockchain node and the transaction record retrieved from the blockchain are both input into the judicial decision logic to obtain a judicial decision on the loan, wherein the judicial decision comprises a decision that the loan applicant is required to repay the loan amount within a predetermined period of time, and wherein the judicial decision is uploaded to the blockchain for evidence storage in a form of a judicial decision transaction.

10. The non-transitory, computer-readable medium of claim 9, wherein the transaction record further comprises proof of repayment of the repayment amount paid on or before the repayment date.

11. The non-transitory, computer-readable medium of claim 9, wherein the judicial decision is retrieved by the insurance network node of the blockchain network associated with the insurance agency to execute an insurance policy for repaying the loan for the loan applicant.

12. The non-transitory, computer-readable medium of claim 9, wherein the blockchain network is a consortium blockchain network.

* * * * *